(No Model.)  4 Sheets—Sheet 3.
C. G. WILSON.
BALING PRESS.
No. 413,271. Patented Oct. 22, 1889.
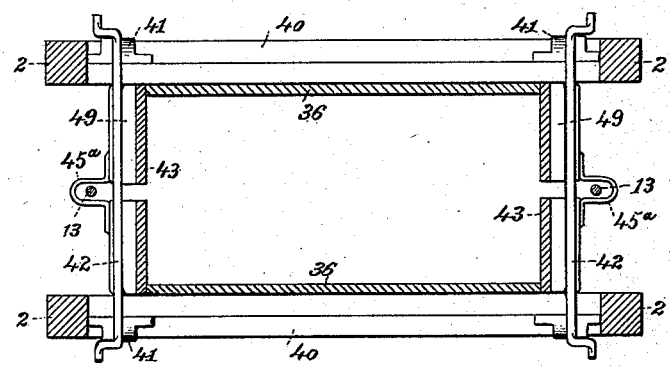
FIG. III.
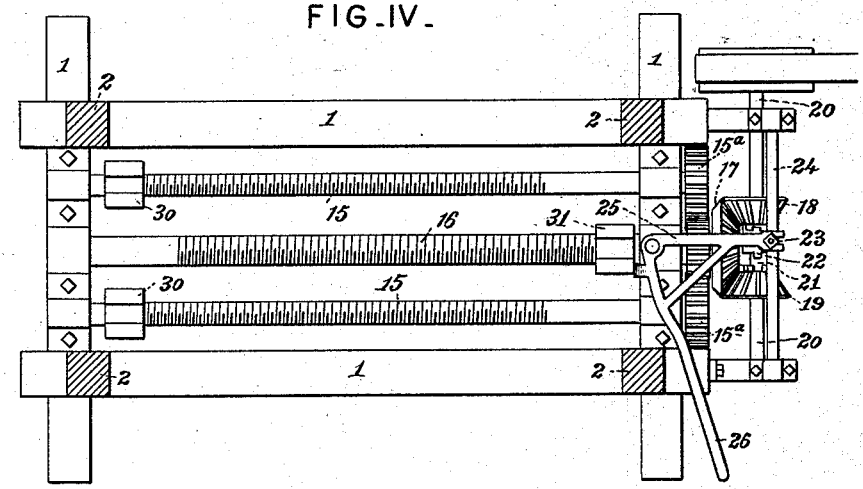
FIG. IV.
Attest:
Geo. T. Smallwood.
E. Arthur.
Inventor:
Carlos G. Wilson.
By Knight Bros.
Attys (No Model.) 4 Sheets—Sheet 4.
C. G. WILSON.
BALING PRESS.
No. 413,271. Patented Oct. 22, 1889.
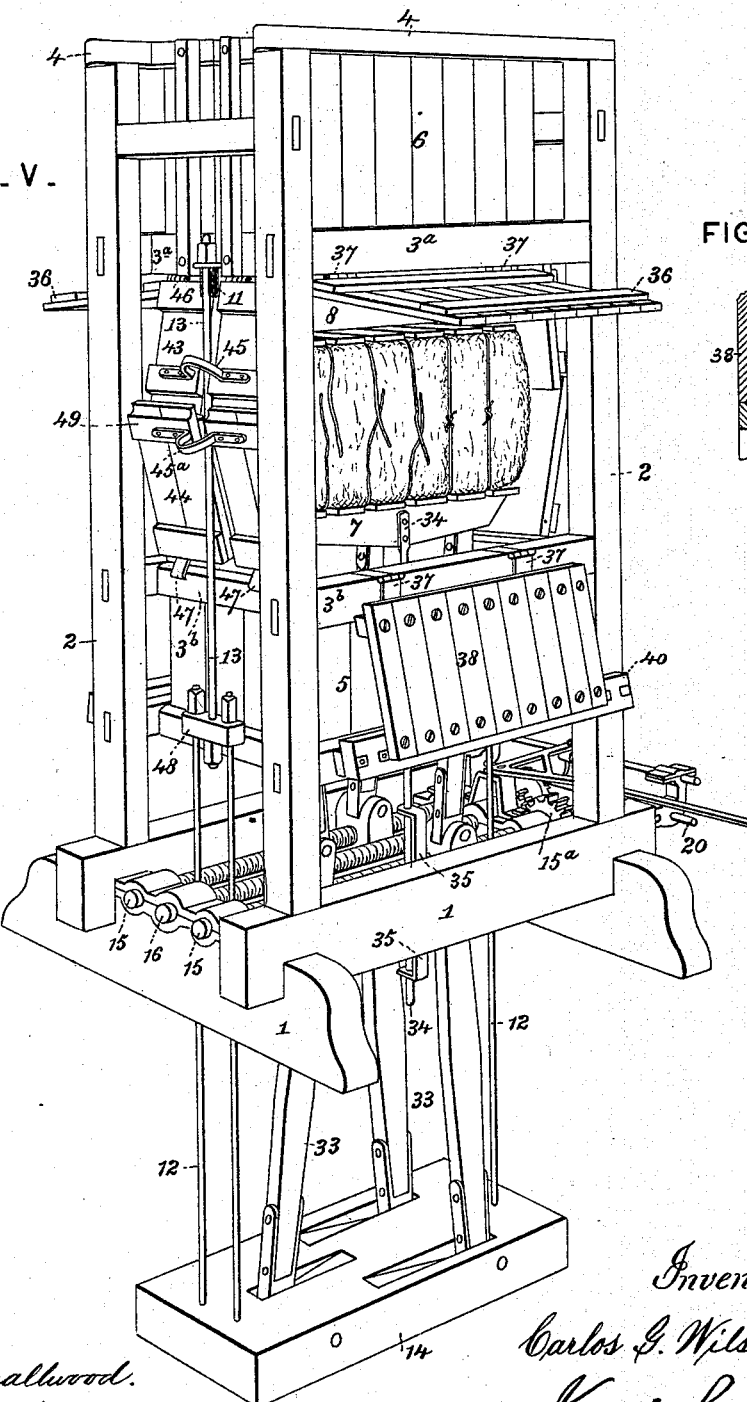
FIG. V.
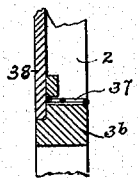
FIG. VI
Attest:
Geo. T. Smallwood.
E. Arthur.
Inventor:
Carlos G. Wilson
By Knight Bros.
Attys

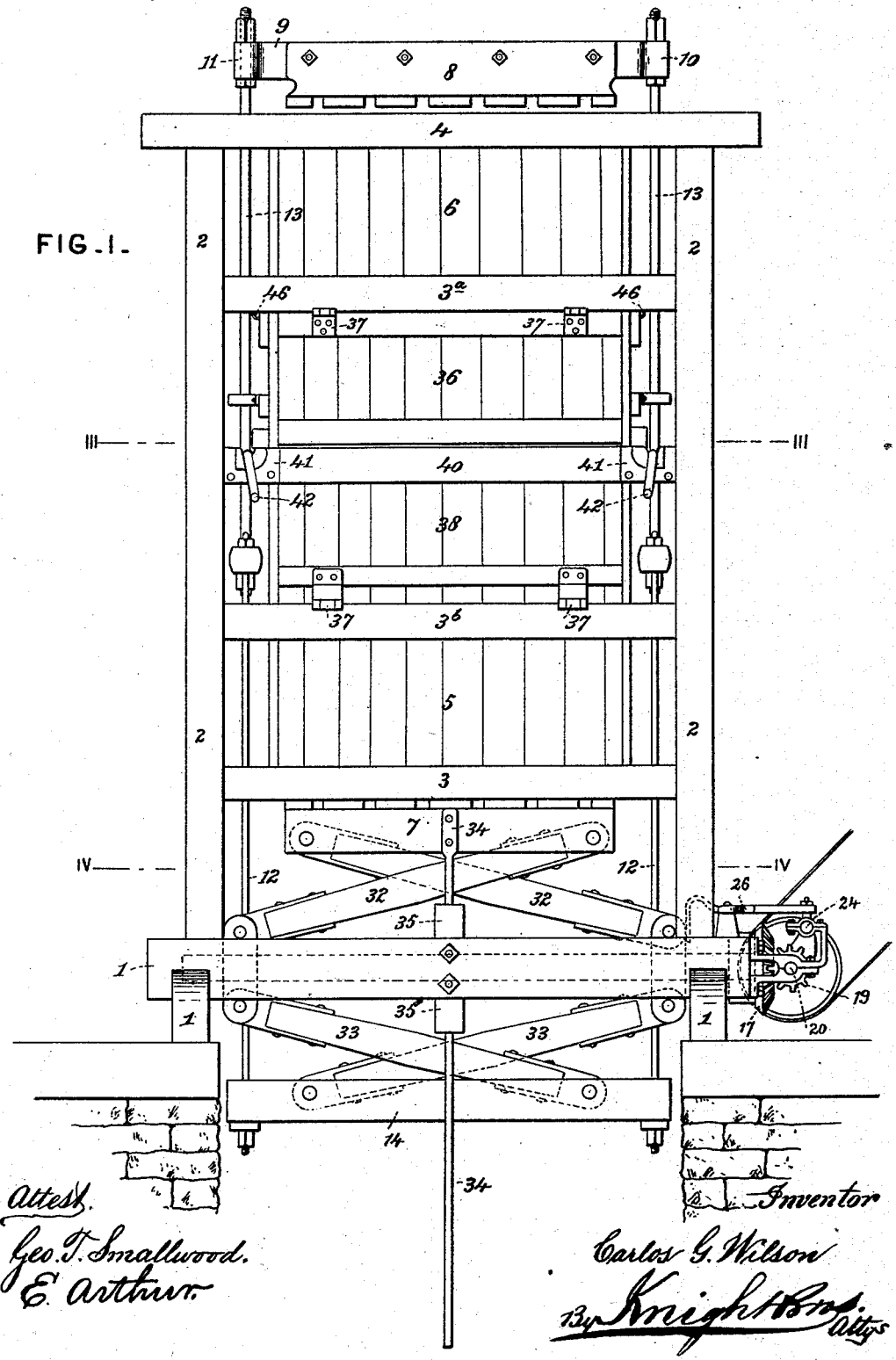

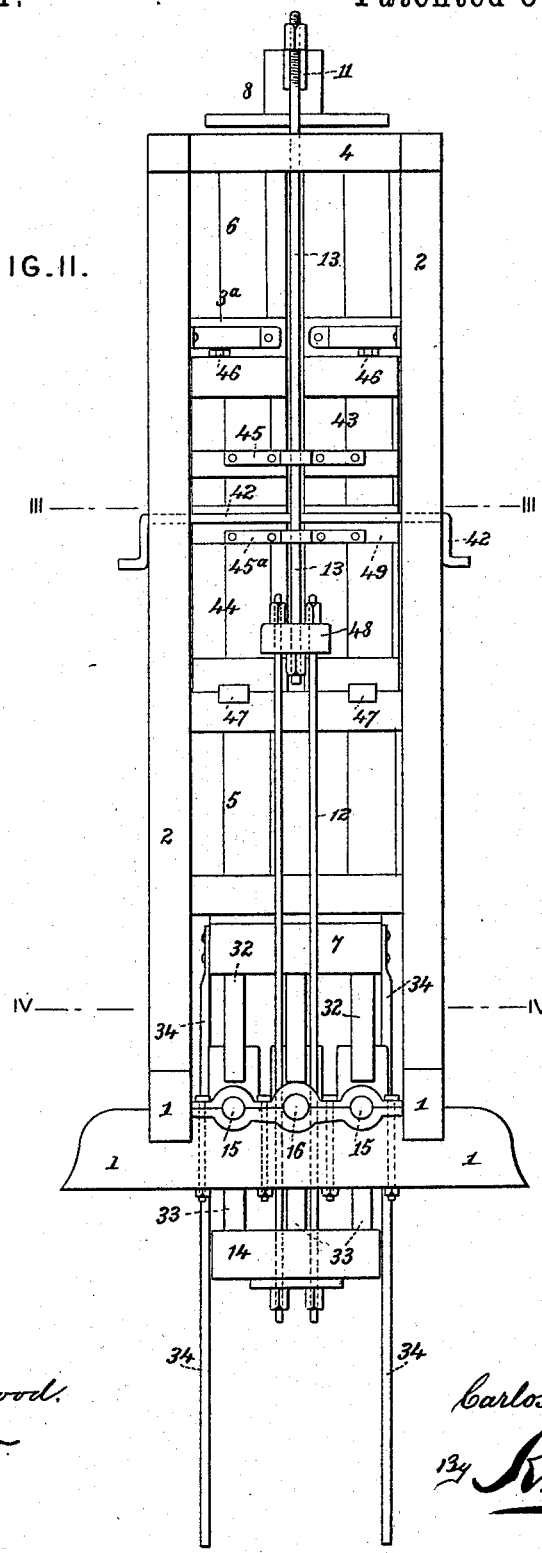

UNITED STATES PATENT OFFICE.

CARLOS G. WILSON, OF MILLEDGEVILLE, GEORGIA.

BALING-PRESS.

SPECIFICATION forming part of Letters Patent No. 413,271, dated October 22, 1889.

Application filed May 9, 1888. Serial No. 273,276. (No model.)

*To all whom it may concern:*

Be it known that I, CARLOS G. WILSON, a citizen of the United States, residing at Milledgeville, in the county of Baldwin and State of Georgia, have invented certain new and useful Improvements in Baling-Presses, of which the following is a full, clear, and exact description.

The object of this invention is to provide a baling-press which will compress cotton or other material into a bale of small dimensions by simple and effective machinery, such as can be used on the plantation. The press-box is constructed of upper and lower sections with closed sides and ends, open at top and bottom, and with a central section surrounded by side and end doors, which, when the pressing operation is completed, may be opened, so as to expose the bale on all sides preparatory to tying and removing it from the press. The pressure is effected by oppositely-moving followers, which, for distinction, are referred to hereinafter as the "upper" and "lower" follower, to which a simultaneous movement is imparted by toggle-bars acting directly on the lower follower beneath, and, through the medium of a cross-head and tie-rods, upon the follower at the top of the press, so as to force them together, as hereinafter described.

To bring the operating machinery within small compass and produce a movement of the followers rapid at first, while the cotton is loose, and increasing in power as the work progresses, I employ three pairs of toggle-bars, the outer ones of which are stepped or jointed close to one end of the lower follower and the cross-head, respectively, while the central pair are stepped or jointed in the other end of the lower follower and the cross-head, and each pair of bars is jointed to a nut traveling upon a screw, the three screws being geared together, so as to receive simultaneous movement.

In another application of even date herewith, Serial No. 273,276, I have described and claimed a press in which the upper and lower followers are operated by paired toggle-bars working upon a single right-and-left screw, so that the operating-nuts starting at the ends of the press are drawn toward each other at the center, and on meeting throw the toggle-bars into nearly vertical position.

My present invention differs from that last referred to, in that I employ three screws, as before stated, so that the operating-nuts starting from one end of the press are drawn completely over to the other end, the toggle-bars being stepped or jointed to the ends of the lower follower and cross-head instead of to the center thereof, and I am thereby able to impart a greater horizontal movement to the nuts, and consequently a greater vertical movement to the followers, with a given length of driving-screw.

In the accompanying drawings, Figure I is a side view of the press, showing the followers retracted in readiness for swinging the upper follower around for filling the press. Fig. II is an end view of the same. Fig. III is a horizontal section through the press-box on the line III III, Figs. I and II. Fig. IV is a horizontal section on the line IV IV, Figs. I and II, with the toggles removed, so as to show a plan view of the operating mechanism. Fig. V is a perspective view showing the pressing operation completed and the press-box opened preparatory to the tying and removal of the bale. Fig. VI is a detail section showing one of the beams of the frame and a portion of the door engaging therewith in closed position.

1 represents the horizontal base-frame of the press, on which are mounted standards 2 2, connected at suitable intervals by horizontal beams 3 $3^a$ $3^b$ and at top by the upper horizontal beams 4 4.

5 6 represent, respectively, the lower and upper stationary portions of the press-box, within which the lower follower 7 and upper follower 8 move vertically. The upper follower 8 is attached to a horizontal follower block or beam 9, constructed at one end with a swivel 10 and at the other with an open socket 11, by which the follower-block is secured to tie-rods 12 13, which connect it to a cross-head 14 at the bottom of the press. The open socket 11 permits the ready separation of this end of the upper follower from the tie-rod when the upper follower is to be turned around to open the top of the press-box.

15 16 15 are three driving-screws geared together by pinions 15ª, so that the two outer ones will turn in unison and in an opposite direction to the center one. The central driving-screw 16 is rotated by a bevel-gear 17 by means of either of a pair of opposed pinions 18 19, within which the counter-shaft 20 is arranged to turn loosely. The center of the counter-shaft 20 is formed square, as shown at 21 in Fig. IV, to impart rotation to the clutch member 22, which slides on the said shaft, and is thereby made to engage with either of the pinions 18 19, so as to turn the driving-screw 16 in either direction by a continuous rotation of the counter-shaft 20. If the clutch member be left in an intermediate position, the rotation of the counter-shaft 20 imparts no motion to the driving-screw. The sliding motion is imparted to the clutch member 22 by a shipper 23, mounted on a rod 24, which slides in suitable guides and is operated by a bell-crank 25, having a projecting handle 26 for moving the said bell-crank shipper and clutch member by hand when required. On the respective driving-screws 15 16 15 are nuts 30 31 30, in which are stepped or articulated the meeting ends of paired toggle-bars 32 33. The upper toggle-bars 32 are jointed or stepped underneath the lower follower 7, and the lower toggle-bars 33 are stepped or jointed in the cross-head 14, which is connected to and actuates the block or beam 9, carrying the upper follower 8.

34 represents guide-rods projecting rigidly from the lower follower 7 and working in sockets 35 in the base of the press, so as to hold the lower follower 7 in horizontal position. The upper side doors 36 are connected to the horizontal beams 3ª by hinges 37, permitting the said doors to be turned upward into horizontal position for tying and removing the bale. The lower side doors 38 are connected to the horizontal beams 3ᵇ by double hinges 37, permitting these doors to drop outward into vertical position, completely out of the way, to give better access to the compressed bale for tying the same and facilitating its removal. The upper edges of the side doors 38 are provided with horizontal battens 40, projecting over the lower edges of the pendent upper doors 36, so as to confine the same, and provided on the outer faces of their projecting ends with oblique-faced keepers 41, for the reception of clamp-bars 42, which extend across the ends of the press-box and by their downturned ends engage over the oblique faces of the keepers 41, so as to draw the side doors tightly together. The ends of the press-box are also constructed with doors 43 44, each made in two parts, separated by a vertical slot, said parts being connected together by yokes 45 and 45ª, which pass around the tie-rods 13, so as to permit the said end doors 43 44 to pass the tie-rods in opening and closing. The pendent upper end doors 43 are hinged to the horizontal upper beams 3ª by hinges 46, and the lower doors 44 are hinged to the lower horizontal beams 3ᵇ by double hinges 47, permitting the free movement of the said lower doors.

It will be noted by reference to Figs. I and II that the tie-rods 12, which are made double to permit the toggle-bars 32 33 to work between them, are connected by couplings 48 to single rods 13, which extend upward to the upper follower-beam 9. The upper edges of the lower end doors 44 are provided with battens 49, to which their connecting-yokes 45ª are attached, and which project over the lower edges of the upper doors 43 to confine the same. The battens 49 are grooved to receive the clamp-bars 42, which thus bear laterally against the end doors, securely holding these when the said clamp-bars are locked in the keepers 41 of the doors 38.

Figs. I and II show the position of the parts when the upper and lower follower are separated preparatory to the filling of the press.

When the doors are closed, the edges by which they are hinged engage in rabbets in the horizontal beams 3ª 3ᵇ, as shown in the detail section, Fig. VI, so as to relieve the hinges of pressure.

Operation: The parts being in the position shown in Figs. I and II, but with the upper follower swung around to expose the top of the press, the press is ready for filling. This done and the upper follower closed over the top of the press and connected to the tie-rod 13, movement is imparted to the driving-screws, which, acting through the toggle-bars 32 33, cause the followers to travel toward one another within the press-box quite rapidly at the start, while the cotton is loose, and with decreasing speed and greatly-increased power as the cotton becomes condensed, the toggle-bars exerting an enormous pressure toward the end of the stroke when they reach a nearly-parallel position.

The perspective view, Fig. V, shows the relative positions of the parts when the bale is compressed, the tie-rods 13 being at this time drawn down sufficiently to take the couplings 48, which connect the double tie-rods 12 with the single rods 13, down out of the way of the end doors 44. By this simple mechanism I provide a plantation-press which will pack a bale on the plantation into very small dimensions, effecting a great saving in transportation from the interior to the seaports or the compressors. Wherever the pressing action is arrested by shifting the clutch from the forward driving-pinion the effect of the screw 16, nuts 31, and toggle-bars 32 33 is to lock the followers in any position which they have reached, and after a bale is tied it is quickly released by a further movement of the clutch 22, throwing it into gear with the opposite driving-pinion, which imparts a reversed movement to the screw from the same continuous movement of the engine and counter-shaft 20.

It will now be clearly understood that by the use of three driving-screws 15 16 15 and separate nuts and toggle-bars connected therewith I am enabled to operate the toggle-bars with a horizontal stroke of the full length of the press, thereby giving a long vertical stroke, by driving machinery occupying moderate space horizontally and operating with great rapidity and force, as already explained. The pressing being completed, the clamp-bars 42 are turned so as to release the doors by a gradual movement. The side doors are opened, as represented in Fig. VI, for the tying of the bale in the customary manner, and the end doors may also be turned completely back out of the way to expose the interior of the press-box.

Having thus described my invention, the following is what I claim as new therein and desire to secure by Letters Patent:

1. The combination, with the lower follower 7 and cross-head 14, of the three screws 15 16 15, the nuts 30 31, traveling on said screws, and the paired toggle-bars carried by the said nuts and stepped at their opposite ends into the follower and cross-head, respectively.

2. The combination, with the lower follower 7, cross-head 14, screws 15 16 15, and nuts 30 31, of the toggle-bars 32 33, stepped into the follower and crossing or passing one another, as herein shown and described, to afford increased length of stroke.

3. The combination of the press-box, upper and lower followers, cross-heads, tie-rods, and crossed toggle-bars operated by separate screws geared together so as to have simultaneous movement, substantially as described.

CARLOS G. WILSON.

Witnesses:
JAMES A. GREEN,
WALTER PAINE.